Charles B. Bristol,
Attaching Door Knobs to Spindles.

No. 72597

PATENTED
DEC 24 1867

Witnesses
R. Fitzgerald
Eleazar T. Fitch

Chas. B. Bristol

United States Patent Office.

CHARLES B. BRISTOL, OF NEW HAVEN, CONNECTICUT.

Letters Patent No. 72,597, dated December 24, 1867.

---

IMPROVEMENT IN ATTACHING DOOR-KNOBS TO SPINDLES.

---

The Schedule referred to in these Letters Patent and making part of the same.

---

TO ALL WHOM IT MAY CONCERN:

Be it known that I, CHARLES B. BRISTOL, of the city and county of New Haven, in the State of Connecticut, have invented a new and useful Improvement in Attaching Door-Knobs to their Spindles, (it being an improvement on my patent issued March 5, 1867;) and I do hereby declare that the following is a full, clear, and exact description of the construction, character, and operation of the same, reference being had to the accompanying drawings, which make part of this specification, in which—

My improvement on my device patented March 5, 1867, consists in forming the inclined plane, on which the screw binds to secure the knob at its proper adjustment, on the longitudinal corner of the spindle, or parallel with the diagonal of the cross-section of the spindle, and in making or leaving a projection or stop near the end of the spindle, to hold the knob from falling off when the binding-screw is partially withdrawn, as during a readjustment, or by accident, or in any other case.

Figure 1:
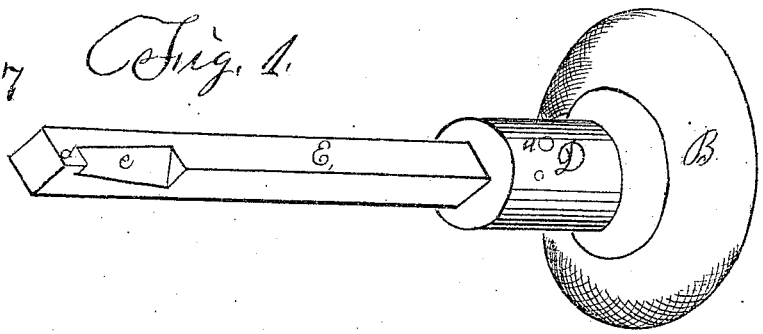
Figure 1 is a perspective view of the spindle, with the permanent knob attached, showing the position of the inclined plane and the projecting stop at the end.

I make the knobs A and B in any of the usual ways, and secure the knob B by a pin in the usual way, as indicated at $a$, fig. 1. And in the neck C, of the knob A, I make and tap a hole to receive the binding-screw, as shown at $b$, fig. 2. I make the spindle of a square bar, in the usual way, except that at or near one end I file or cut away a portion of one of the longitudinal corners, as represented at $c$, figs. 1 and 2, which space I cut deeper toward the centre of the spindle, so as to form an inclined plane of the same character as that described in my patent of March 5, 1867, except that I form the inclined plane on the longitudinal corner, (as shown at $c$,) instead of one of the sides or faces of the square. This inclined plane $c$ may be made of any desired degree of depression, as a very slight incline, which would vanish at the extreme corner $d$, would be sufficient, if all the parts were accurately made and fitted and the stop $d$ dispensed with. But I prefer dressing down or taking off the corner or angle until the flat surface, parallel to the diagonal, shall be at its narrowest point equal to the diameter of the screw. And when thought best, I form or leave a projection or stop at the extreme corner, as represented at $d$, figs. 1 and 2, to prevent the knob from slipping off when the binding-screw is partially withdrawn for readjustment of the knob, &c. But it is of no importance to the operation of adjusting or securing the knob at its proper position. I make the binding-screw, as shown at $b$, of the proper length to pass through the neck C, and press upon the inclined plane.

Figure 2:
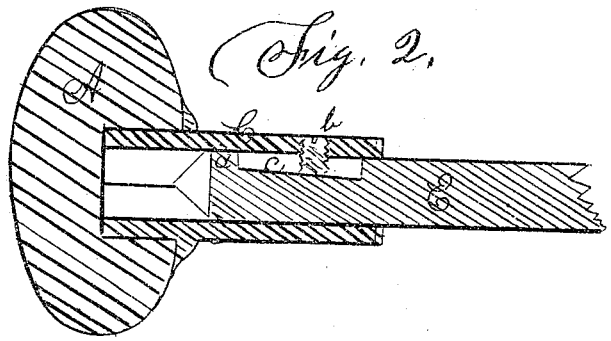
Figure 2 is a section cut longitudinally through the centre of the adjustable knob, spindle, and screw, showing the relative position of the parts.

In fitting knobs under my patent of March 5, 1867, I have become satisfied that making the inclined plane on the corner or angle, as shown at $c$, figs. 1 and 2, is so far preferable in practice that I have deemed it proper to ask for a patent for it as an improvement, as it saves much labor in fitting, and weakens the spindle less, and as the binding-screw acts in the diagonal direction, the spindle will rest on two sides, and thus have double the bearing-surface, and so render the whole more firm.

Having made the parts as before described, I pass the spindle through the door, put on the knob A, and when properly adjusted, turn in the screw $b$ until it presses firmly on the inclined plane $c$, all as represented in fig. 2, (and as described in my patent of March 5, 1867,) when it will be ready for use.

What I claim as my invention, and desire to secure by Letters Patent, (as an improvement on my patent issued March 5, 1867,) is—

The use of the inclined plane $c$, when formed on the corner of the spindle E, in combination with the binding-screw $b$ and the neck C of the knob A, and the whole is constructed and made to secure the knob A in its desired position without making holes in or putting washers on the spindle, substantially as herein described and set forth

CHAS. B. BRISTOL.

Witnesses:
ELEAZAR T. FITCH,
R. FITZGERALD.